United States Patent [19]

Geoffrey et al.

[11] Patent Number: 5,189,079
[45] Date of Patent: Feb. 23, 1993

[54] LOW FREE FORMALDEHYDE PHENOLIC POLYOL FORMULATION

[75] Inventors: Michael M. Geoffrey, Oak Park; Robert A. Laitar, Woodridge, both of Ill.

[73] Assignee: Acme Resin Corp., Westchester, Ill.

[21] Appl. No.: 714,267

[22] Filed: Jun. 12, 1991

[51] Int. Cl.⁵ .................................. C08G 8/36
[52] U.S. Cl. .................... 523/142; 523/139; 523/143; 523/145; 523/147; 528/129; 528/137; 528/140; 528/142; 528/161; 528/214
[58] Field of Search ............... 528/129, 137, 140, 142, 528/161, 214; 523/142, 143, 145, 147, 139

[56] References Cited

U.S. PATENT DOCUMENTS

| | | | |
|---|---|---|---|
| 2,376,213 | 5/1945 | Watson et al. | |
| 3,156,670 | 11/1964 | Soldatos | 528/129 |
| 3,894,981 | 7/1975 | Kruglikov et al. | 528/129 |
| 4,079,031 | 3/1978 | Sardessai et al. | 523/143 |
| 4,148,777 | 4/1979 | Le Bar et al. | 523/143 |
| 4,150,194 | 4/1979 | Watts et al. | 428/531 |
| 4,157,324 | 6/1979 | Culbertson | 528/139 |
| 4,209,428 | 6/1980 | Dumolo | 523/143 |
| 4,404,334 | 9/1983 | Bornstein | 525/504 |
| 4,448,951 | 6/1984 | Rupert et al. | 528/129 |
| 4,473,669 | 9/1984 | Rupert et al. | 521/177 |
| 4,546,124 | 10/1985 | Laitar et al. | 523/143 |
| 4,634,758 | 1/1987 | Laitar et al. | 528/129 |
| 4,723,592 | 2/1988 | Laitar et al. | 523/143 |
| 5,021,539 | 6/1991 | Armbruster et al. | 523/143 |

Primary Examiner—John Kight, III
Assistant Examiner—Richard Jones
Attorney, Agent, or Firm—Rockey, Rifkin and Ryther

[57] ABSTRACT

A resin is prepared by the reaction of a phenol, an aldehyde and an aliphatic hydroxy compound containing two or more hydroxy groups per molecule in the presence of a divalent metal ion catalyst. These resins react with polyisocyanates to form polyurethanes that are useful binders for foundry cores and molds.

9 Claims, No Drawings

LOW FREE FORMALDEHYDE PHENOLIC POLYOL FORMULATION

FIELD OF THE INVENTION

This invention relates to a method for preparing modified phenolic resole resins useful in binder compositions and to a process for making foundry cores and molds employing these binders. More particularly, the invention relates to a multistep process which incorporates into the resin an aliphatic hydroxy compound which contains two or more hydroxy groups per molecule.

BACKGROUND OF THE INVENTION

Binders or binder systems for foundry cores and molds are well known. In the foundry art, cores or molds for making metal castings are normally prepared from a mixture of an aggregate material, such as sand, and a binding amount of a binder system. Typically, after the aggregate material and binder have been mixed, the resultant mixture is rammed, blown or otherwise formed to the desired shape or patterns, and then cured with the use of catalyst and/or heat to a solid, cured state.

Resin binders used in the production of foundry molds and cores are often cured at high temperatures to achieve the fast-curing cycles required in foundries. However, in recent years, resin binders have been developed which cure at a low temperature, to avoid the need for high-temperature curing operations which have higher energy requirements and which often result in the production of undesirable fumes.

One group of processes which do not require heating in order to achieve curing of the resin binder are referred to as "cold-box" processes. In such processes, the binder components are coated on the aggregate material, such as sand, and the material is blown into a box of the desired shape. Curing of the binder is carried out by passing a gaseous catalyst at ambient temperatures through the molded resin-coated material. In such processes, the binder components normally comprise a polyhydroxy component and a polyisocyanate component. These cure to form a polyurethane in the presence of a gaseous amine catalyst.

Another group of binder systems which do not require gassing or heating in order to bring out curing are known as "no-bake" systems. These "no-bake" systems also frequently employ an aggregate material, such as sand coated with a polyhydroxy component and a polyisocyanate component. In this case, the coated sand is usually mixed with a liquid tertiary amine catalyst just before the sand is placed into a holding pattern or core box, and the material is allowed to cure at ambient temperatures or slightly higher.

Although developments in resinous binder systems which can be processed according to the "cold-box" or "no-bake" processes have resulted in the provisions of useful systems, workers have continually sought to improve the binders of these systems. One such improvement is disclosed in U.S. Pat. No. 4,546,124 issued on Oct. 8, 1985 to Laitar et al. This patent, which describes an alkoxy modified phenolic resole resin as the polyhydroxy component of the polyurethane binder, is incorporated herein by reference in its entirety.

Various other workers have disclosed techniques for modifying phenolic resins. However, none of these modified resins have been used as components of binders for foundry cores and molds. For example, U.S. Pat. No. 2,376,213 discloses that water miscible phenolic resins can be prepared by the reaction of phenol with an excess of formaldehyde in the presence of a polyhydroxy alcohol using an alkali metal hydroxide as a catalyst. On the other hand, U.S. Pat. No. 3,156,670 discloses the formation of a water insoluble liquid phenolic resin. The phenolic nuclei are said to be linked together by dihydric glycol residues through aliphatic ether linkages. The reaction between the phenol, formaldehyde and the glycol is carried out using an alkaline catalyst and then the reaction is completed by dehydration under acidic conditions.

Preparation of molding materials is disclosed in U.S. Pat. No. 3,894,981. These are prepared by the reaction of phenol, an aldehyde, and a monohydric or dihydric alcohol in the presence of a filling agent such as wood flour or asbestos. The reaction is carried out under mildly acidic anhydrous conditions at high temperatures. Another modified phenolic resin said to be useful for making resin impregnated filter paper is disclosed in U.S. Pat. No. 4,150,194. It is prepared by the reaction of phenol with an aqueous aldehyde and a glycol in the presence of an alkaline catalyst.

Three patents disclose modified phenolic resins which have been used to make urethane foams. In U.S. Pat. No. 4,404,334, phenol, anhydrous formaldehyde and a glycol are reacted in the presence of zinc acetate catalyst under nonrefluxing conditions. The products are said to be useful to plasticize conventional phenolic resins or to prepare improved heat and flame resistant polyurethane foams. U.S. Pat. Nos. 4,448,951 and 4,473,669 disclose the reaction of phenol and nonaqueous aldehydes with an alcohol or polyol in the presence of a divalent metal ion catalyst. The products were used to make solid urethane foams of low friability and low combustibility.

All of the resole resins previously used to make urethane foundry binders have possessed an undesirable formaldehyde odor. The release of appreciable quantities of formaldehyde into the atmosphere is undesirable from an environmental view point. Previous attempts to reduce the amount free formaldehyde in the resin has required long periods of heating and has produced resins of undesirably high viscosity.

We have now discovered a process whereby modified resole resins can be prepared which emit little formaldehyde and yet retain their desired range of viscosity. These resins can be used to make urethane binders particularly suitable for use in the "cold-box" and "no-bake" processes. Furthermore, when the resins are combined with polyisocyanates for use in the "cold-box" process, they give a mixture with better bench life than ones prepared with resole resins previously employed.

SUMMARY OF THE INVENTION

In accordance with this invention, there is provided a method for preparing a modified orthobenzylic ether-containing resole resin which comprises the steps:
(a) reacting a phenol in the presence of a divalent metal ion catalyst at a pH below about 7 with a molar excess of an aqueous aldehyde;
(b) adding to the reaction mixture of step (a) from about 0.001 to about 0.03 mole of an aliphatic hydroxy compound per mole of phenol when from 0% to about 85% of the aldehyde has reacted;
(c) reacting the mixture of step (b) until from about 80% to about 98% of the aldehyde has reacted; and (d) heating the reaction mixture of step (c) under vacuum until the amount of free formaldehyde in the mixture is less than about 1% by weight, wherein the aliphatic hydroxy compound added in step (b) contains two or more hydroxy groups per molecule and has a hydroxyl number of from about 200 to about 1850.

Further provided, in accordance with this invention, is a method for preparing a modified orthobenzylic ether-containing resole resin which comprises the steps:
(a) reacting a phenol in the presence of a divalent metal ion catalyst at a pH below about 7 with a molar excess of an aqueous aldehyde and at least about 0.25 mole of a monohydric alcohol per mole of phenol;
(b) adding to the reaction mixture of step (a) from about 0.001 to about 0.03 mole of an aliphatic hydroxy compound per mole of phenol when from 0% to about 85% of the aldehyde- has reacted;
(c) reacting the mixture of step (b) until from about 80% to about 98% of the aldehyde has reacted; and
(d) heating the reaction mixture of step (c) under vacuum until the amount of free formaldehyde in the mixture is less than about 1% by weight, wherein the aliphatic hydroxy compound added in step (b) contains two or more hydroxy groups per molecule and has a hydroxyl number of from about 200 t about 1850.

Further, in accordance with the invention, there is provided a binder composition comprising a mixture of a phenolic resin component, an isocyanate component selected from diisocyanates and polyisocyanates and sufficient catalyst to catalyze the reaction between the phenolic resin component and the isocyanate component wherein the phenolic resin component is a modified orthobenzylic ether-containing resole resin which has covalently bound into the resin an aliphatic hydroxy compound which contains two or more hydroxy groups per molecule and has a hydroxy number of from about 200 to about 1850.

Finally, in accordance with the invention, there is provided a process for making foundry cores or molds which comprises admixing aggregate material, such as a foundry sand or the like, and a binding amount of a binder composition comprising a phenolic resin component, an isocyanate component selected from diisocyanates and polyisocyanates and sufficient catalyst to catalyze the reaction between the phenolic resin component and the isocyanate component wherein the phenolic resin component is a modified orthobenzylic ether-containing resole resin which has covalently bound into the resin an aliphatic hydroxy compound which contains two or more hydroxy groups per molecule and has a hydroxyl number of from about 200 to about 1850.

DETAILED DESCRIPTION OF THE INVENTION

The modified orthobenzylic ether-containing resole resin prepared by the method of this invention is prepared by the reaction of a phenol and an aldehyde in the presence of an aliphatic hydroxy compound containing two or more hydroxy groups per molecule. In one preferred modification of the process, the reaction is also carried out in the presence of a monohydric alcohol.

Phenols suitable for preparing the modified phenolic resole resins of this invention are generally any of the phenols which may be utilized in the formation of phenolic resins, and include substituted phenols, as well as unsubstituted phenol per se. The nature of the substituent can vary widely, and exemplary substituted phenols include alkyl-substituted phenols, aryl-substituted phenols, cycloakyl-substituted phenols, alkenyl-substituted phenols, alkoxy-substituted phenols, aryloxy-substituted phenols and halogen-substituted phenols. Specific suitable exemplary phenols include in addition to phenol per se, o-cresol, m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. A preferred phenolic compound is phenol itself.

The aldehyde employed in the formation of the modified phenolic resole resins of this invention can also vary widely. Suitable aldehydes include any of the aldehydes previously employed in the formation of phenolic resins, such as formaldehyde, acetaldehyde, propionaldehyde and benzaldehyde. In general, the aldehydes employed contain from 1 to 8 carbon atoms. The most preferred aldehyde is an aqueous solution of formaldehyde.

Metal ion catalysts useful in production of the modified phenolic resole resins of the present invention include salts of the divalent ions of Mn, Zn, Cd, Mg, Co, Ni, Fe, Pb, Ca, and Ba. Tetraalkoxy titanium compounds of the formula Ti(OR)$_4$ where R is an alkyl group containing from 3 to 8 carbon atoms, are also useful catalysts for this reaction. A preferred catalyst is zinc acetate. These catalysts give phenolic resole resins wherein the preponderance of the bridges joining the phenolic nuclei are ortho-ortho benzylic ether bridges of the general formula —CH$_2$(OCH$_2$)$_n$— where n is a small positive integer.

A molar excess of aldehyde per mole of phenol is used to make the resole resins of this invention. It is preferable that the molar ratio of aldehyde to phenol be in the range of from about 1.1:1 to about 2.2:1.

In the practice of this invention, the phenol and aldehyde are reacted in the presence of the divalent metal ion catalyst at a pH below about 7. A convenient way to carry out the reaction is by heating the mixture under reflux conditions. Reflux, however, is not required.

To the reaction mixture is added an aliphatic hydroxy compound which contains two or more hydroxy groups per molecule. The hydroxy compound is added at a molar ratio of hydroxy compound to phenol of from about 0.001:1 to about 0.03:1. This hydroxy compound may be added to the phenol and aldehyde reaction mixture at any time when from 0% (i.e., at the start of the reaction) to when about 85% of the aldehyde has reacted. It is preferred to add the hydroxy compound to the reaction mixture when from about 50% to about 80% of the aldehyde has reacted.

Useful hydroxy compounds which contain two or more hydroxy groups per molecule are those having a hydroxyl number of from about 200 to about 1850. The hydroxyl number is determined by the standard acetic anhydride method and is expressed in terms of mg KOH/g of hydroxy compound. Suitable hydroxy compounds include ethylene glycol, propylene glycol, 1,3-propanediol, diethylene glycol, triethylene glycol, glycerol, sorbitol and polyether polyols having hydroxyl numbers greater than about 200. Glycerol is a particularly suitable hydroxy compound for use in the process of this invention.

After the aliphatic hydroxy compound containing two or more hydroxy groups per molecule is added to the reaction mixture, heating is continued until from about 80% to about 98% of the aldehyde has reacted. Although the reaction can be carried out under reflux until about 98% of the aldehyde has reacted, prolonged heating is required and it is preferred to continue the heating only until about 80% to 90% of the aldehyde has reacted. At this point, the reaction mixture is heated under vacuum at a pressure of about 50 mm of Hg until the free formaldehyde in the mixture is less than about 1%. Preferably, the reaction is carried out at 95° C. until the free formaldehyde is less than about 0.1% by weight of the mixture. The catalyst may be precipitated from the reaction mixture before the vacuum heating step if desired. Citric acid may be used for this purpose.

In one preferred modification of the method of preparing a modified orthobenzylic ether-containing resole resin of this invention, the reaction mixture also contains at least about 0.25 mole of a monohydric alcohol per mole of phenol. The alcohol may be any primary or secondary monohydric aliphatic alcohol containing from 1 to 8 carbon atoms. Examples of useful alcohols are methanol, ethanol, n-propanol, isopropanol, n-butanol and hexanol. Methanol is a preferred alcohol. The monohydric alcohol is generally added to the reaction mixture of phenol and aqueous aldehyde at the start of the reaction. However, it may be added at a later point in the reaction if desired. Use of at least about 0.25 mole of alcohol per mole of phenol will generally provide the desired degree of substitution. Although higher molar ratios of alcohol to phenol may be employed, the presence of a large amount of alcohol tends to slow down the reaction between the phenol and the aldehyde and leave considerable amounts of unreacted alcohol to be evaporated a the end of the reaction.

As noted above, the modified orthobenzylic ether-containing resole resins prepared by the method of this invention can be used to prepare binder compositions. Such compositions comprise a mixture of the phenolic resin component, an isocyanate component selected from diisocyanates and polyisocyanates and sufficient catalyst to catalyze the reaction between the phenolic resin component and the isocyanate component.

The isocyanate component which can be employed in a binder according to this invention may vary widely and has a functionality of 2 or more. Exemplary of the useful isocyanates are organic polyisocyanates such as tolylene-2,4-diisocyanate, tolylene-2,6-diisocyanate, and mixtures thereof, and particularly the crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4"-triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following general formula:

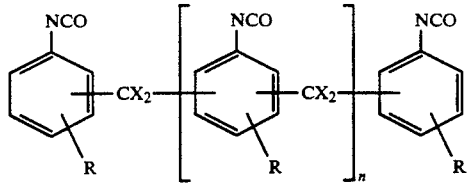

wherein R is selected from the group consisting of hydrogen, chlorine, bromine, alkyl groups having 1 to 5 carbon atoms; X is selected from the group consisting of hydrogen, alkyl groups having 1 to 10 carbon atoms and phenyl; and n has an average value of at least about 1 and generally about 1 to about 3. The preferred polyisocyanate may vary with the particular system in which the binder is employed.

Generally, the amounts of the phenolic component and the isocyanate component employed in a binder composition of the invention are not critical and can vary widely. However, there should at least be enough of the isocyanate component present to give adequate curing of the binder.

The isocyanate component is generally employed in a range of from about 15% to about 400% by weight, based on the weight of the phenolic component, and is preferably employed in a range of from about 20 to about 200%. Moreover, a liquid isocyanate can be used in undiluted form, so long as there is sufficient solvent employed with the phenolic component, solid or viscous isocyanates can also be utilized and are generally used with an organic solvent. In this respect, the isocyanate component may include up to 80% by weight of solvent.

Furthermore, it is to be understood that in accordance with the invention, both the phenolic and isocyanate components are, as a practical matter, preferably dissolved in solvents in order to provide component solvent mixtures of desirable viscosity and thus facilitate the use of the same, such as in coating aggregate material with the components. In this respect, sufficient solvents are employed to provide a Brookfield viscosity of solutions of the components which is below about 1000 centipoises (cps) and preferably less than about 500 centipoises. More specifically, while the total amount of solvent can vary widely, it is generally present in a composition of this invention in a range of from about 5% to about 70% by weight, based on total weight of the polyhydroxy component, and is preferably present in a range of from about 20% to about 60% by weight.

The solvents employed in the practice of this invention are generally mixtures of hydrocarbon and polar organic solvents such as organic esters.

Suitable exemplary hydrocarbon solvents include aromatic hydrocarbons such as benzene, toluene, xylene, ethyl benzene, high boiling aromatic hydrocarbon mixtures, heavy aromatic naphthas and the like. It is preferred to use hydrocarbon solvents with a flash point about 100° F.

As previously indicated hereinabove, the compositions of this invention can be cured by both the "cold-box" and "no-bake" processes. The compositions are cured by means of a suitable catalyst. While any suitable catalyst for catalyzing the reaction between the phenolic resin component and isocyanate component may be used, it is to be understood that when employing the "cold-box" process, the catalyst employed is generally a volatile catalyst. On the other hand, where the "no-bake" process is employed, a liquid catalyst is generally utilized. Moreover, no matter which process is utilized, that is, the "cold-box" or the "no-bake" process, at least enough catalyst is employed to cause substantially complete reaction of the polyhydroxy and isocyanate component.

Preferred exemplary catalysts employed when curing the compositions of this invention by the "cold-box" process are volatile tertiary amine gases which are passed through a core or mold generally along with an inert carrier, such as air or carbon dioxide. Exemplary volatile tertiary amine catalysts which result in a rapid cure at ambient temperature that may be employed in the practice of the present invention include trimethylamine, triethylamine and dimethylethylamine and the like.

On the other hand, when utilizing the compositions of this invention in the "no-bake" process, liquid tertiary amine catalysts are generally and preferably employed. Exemplary liquid tertiary amines which are basic in nature include those having a $pK_b$ value in a range of from about 4 to about 11. The $pK_b$ value is the negative logarithm of the dissociation constant of the base and is a well-known measure of the basicity of a basic material. The higher the number is, the weaker the base. Bases falling within the mentioned range are generally, organic compounds containing one or more nitrogen atoms. Preferred among such materials are heterocyclic compounds containing at least one nitrogen atom in the ring structure. Specific examples of bases which have a $pK_b$ value within the range mentioned include 4- alkylpyridines wherein the alkyl group has from 1 to 4 carbon atoms, isoquinoline, arylpyridines, such as phenyl pyridine, pyridine, acridine, 2-methoxypyridine, pyridazines, 3-chloropyridine, and quinoline, N-methylimidazole, N-vinylimidazole, 4,4-dipyridine, phenylpropylpyridine, 1-methylbenzimidazole and 1,4-thiazine. Additional exemplary, suitable preferred catalysts include, but are not limited to, tertiary amine catalysts such as N,N-dimethylbenzylamine, triethylamine, tribenzylamine, N,N-dimethyl-1,3-propanediamine, N,N-dimethylethanolamine and triethanolamine. It is to be understood that various metal organic compounds can also be utilized alone as catalysts or in combination with the previously mentioned catalyst. Examples of useful metal organic compounds which may be employed as added catalytic materials are cobalt naphthenate, cobalt octoate, dibutyltin dilaurate, stannous octoate and lead naphthenate and the like. When used in combinations, such catalytic materials, that is the metal organic compounds and the amine catalysts, may be employed in all proportions with each other.

It is further understood that when utilizing the compositions of this invention in the "no-bake" process, the amine catalysts, if desired, can be dissolved in suitable solvents such as, for example, the hydrocarbon solvents mentioned hereinabove. The liquid amine catalysts are generally employed in a range of from about 0.5% to about 15% by weight, based on the weight of the phenolic resin component present in a composition in accordance with the invention.

When employing a binder composition of this invention in the "no-bake" process, the curing time can be controlled by varying the amount of catalyst added. In general, as the amount of catalyst is increased, the cure time decreases. Furthermore, curing takes place at ambient temperature without the need for subjecting the compositions to heat, or gassing or the like. In this regard, however, in usual foundry practice preheating of the sand is often employed to raise the temperature of the sand to from about 30° F. up to as high as 120° F. and preferably up to about 75° F. to 100° F. in order to accelerate the reactions and control temperature and thus provide a substantially uniform operating temperature on a day-to-day basis. However, it is to be understood that such preheating is neither critical nor necessary in carrying out the practice of this invention.

While the binder compositions of this invention may be employed by admixing the same with a wide variety of particulate materials, such as limestone, calcium silicate and gravel and the like, in order to bind the same, and the admixture then manipulated in suitable fashion to form coherent shaped structures, they are particularly useful in the foundry art as binding compositions for foundry sand. Suitable foundry sands include silica, lake, zircon, chromite, olivine sands and the like. When so employed, the amount of binder and sand can vary widely and is not critical. On the other hand, at least a binding amount of the binding composition should be present in order to coat substantially, completely and uniformly all of the sand particles and to provide a uniform admixture of the sand and binder and, so that when the admixture is conveniently shaped as desired and cured, there is provided a strong, uniform, shaped article which is substantially uniformly cured throughout, thus minimizing breakage and warpage during handling of the shaped article, such as, for example, sand molds or cores, so made. In this regard, the binder may be present in a moldable composition, in accordance with this invention, in a range of from about 0.4% to about 6.0% by weight based on the total weight of the composition.

In the practice of this invention, additives normally utilized in foundry manufacturing processes can also be added to the compositions during the sand coating procedure. Such additives include materials such as iron oxide, clay, carbohydrates, potassium fluoroborates, wood flour and the like.

Other commonly employed additives can be optionally used in the binder compositions of this invention. Such additives include, for example, organo silanes which are known coupling agents. The use of such materials may enhance the adhesion of the binder to the aggregate material. Examples of useful coupling agents of this type include amino silanes, epoxy silanes, mercapto silanes, hydroxy silanes and ureido silanes.

In general, the process for making foundry cores and molds in accordance with this invention comprises admixing aggregate material with at least a binding amount of the modified phenolic resole resin component. The resin is dissolved in sufficient solvent to reduce the viscosity of the phenolic resinous component to below about 1000 centipoises. This solvent comprises hydrocarbon solvents, polar organic solvents and mixtures thereof. Then, an isocyanate component, having a functionality of two or more, is added and mixing is continued to uniformly coat the aggregate material with the phenolic resin and isocyanate components. The admixture is suitably manipulated, as for example, by distributing the same in a suitable core box or pattern. A sufficient amount of catalyst is added to substantially and completely catalyze the reaction between the components. The admixture is cured forming a shaped product.

It is to be understood that there is no criticality in the order of mixing the constituents with the aggregate material. On the other hand, the catalyst should generally be added to the mixture as the last constituent of the composition so that premature reaction between the components does not take place. It is to be further understood that as a practical matter, the phenolic resin component can be stored separately and mixed with solvent just prior to use of or, if desirable, mixed with solvent and stored until ready to use. Such is also true with the isocyanate component. On the other hand, as a practical matter, the phenolic and isocyanate components should not be brought into contact with each other until ready to use in order to prevent any possible premature reaction between them. The components may be mixed with the aggregate material either simultaneously or one after the other in suitable mixing devices, such as mullers, continuous mixers, ribbon blenders and the like, while continuously stirring the admixture to insure uniform coating of aggregate particles.

More specifically, however, when the admixture is to be cured according to "cold-box" procedures, the admixture after shaping as desired, is subjected to gassing with vapors of an amine catalyst. Sufficient catalyst is passed through the shaped admixture to provide substantially complete reaction between the components. The flow rate is dependent, of course, on the size of the shaped admixture as well as the amount of phenolic resin therein.

In contrast, however, when the admixture is to be cured according to "no-bake" procedures, the catalyst is generally added to the aggregate material with the phenolic and isocyanate components. The admixture is then shaped and simply permitted to cure until reaction between the components is substantially complete, thus forming a shaped product such as a foundry core or mold. On the other hand, it is to be understood that the catalyst may also be admixed with either one of the components prior to coating of the aggregate material with the components.

Consequently, by so proceeding, as indicated with an admixture of foundry sand and a binding amount of the phenolic and isocyanate components with the catalyst, there is formed a foundry core or mold comprising foundry sand and a binding amount of a binder composition comprising the reaction product of the phenolic and isocyanate components.

The following specific examples illustrate the present invention. They are not intended to limit the invention in any way. Unless otherwise indicated, all parts and percentages are by weight.

EXAMPLE 1

In a 5-liter flask equipped with a stirrer, reflux condensor and thermometer was placed 1325 g phenol, 1269 g of 50% aqueous formaldehyde solution, 359 g of methanol and 112 g of a 25% aqueous solution of zinc acetate. Then, 31 g of glycerol was added and the contents were brought to 95° C. and allowed to reflux until the free formaldehyde concentration as measured by the standard hydroxylamine hydrochloride method was 2.5% by weight. At this point, the mixture was cooled to 50°-60° C. and 10 g of citric acid was added to precipitate the metal catalyst. The batch was then heated under full vacuum (50 mm of Hg) and allowed to react at 95° C. until the measured free formaldehyde was 0.1% by weight. Similar runs were carried out except that the glycerol was added to the reaction mixture at various times after the refluxing had begun. In one experiment, as a control, no glycerol was added. The viscosities of the various solutions were measured at 25° C. using a Brookfield viscometer (Model RVF) with a number 7 spindle. The viscosity was also measured on the control resin (no glycerol added) to which 1.8% glycerol had been added after the resin was cooled to room temperature. The results are given in Table I.

In order to test the amount of formaldehyde in the head space above the liquid, solutions of each resin were prepared by dissolving 65 parts of the resin and 8 parts by weight of dibasic ester DBE-9 in 27 parts by weight of an aromatic hydrocarbon solvent containing 98% aromatics, 2% aliphatics and having a distillation range of 155°-173° C. Dibasic ester (DBE-9) available from DuPont, Wilmington, Del., contains approximately 73% dimethylglutarate, 25% dimethylsuccinate and 1.5% dimethyladipate. Three grams of a solution to be measured was placed in a 35.1 ml vial (Fisher Scientific Catalog No. 03339-5C). A rubber stopper which fit snugly into the top of the vial was modified to accommodate a 1/16 in. internal diameter by 3.25 in. long polyethylene tube and a ⅛ in. internal diameter tube. The smaller tube extended through the stopper so that when the stopper was fitted into the vial, the one end of the tube was one inch above the bottom of the vial and ⅜ in. above the sample. The other end of this tube was left free. The larger diameter tube was connected to an Interscan 4000 Series compact portable analyzer (Interscan Corp., Chatsworth, Calif.). The sample was drawn into the analyzer through the ⅛ in. tube and room air replaced this volume by entering through the 1/16 in. tube. A stabilized reading was obtained within two minutes of sampling. Tests were run at 23° C. and readings were taken after five minutes of sampling. The readings, reported as percentages of the amount of formaldehyde measured for the control containing no glycerol, are also given in Table I.

Proton magnetic resonance spectra of the samples showed that the hydrogens on the primary hydroxyls of glycerol were no longer present in the samples where the glycerol had been heated with the resins. This indicates that the glycerol is covalently bound into the resin. Carbon-13 spectra also indicate that the glycerol is fully incorporated into the resin. No incorporation of the glycerol was indicated when the glycerol was added to the cold resin.

The results given in Table I show that the resins containing incorporated glycerol have lower formaldehyde in the atmosphere above them and have lower viscosity than the control resin prepared without the glycerol or a control resin containing glycerol which was not incorporated in the resin.

TABLE I

Properties Of Modified Resins Containing Glycerol

| Resin No. | % Formaldehyde When Glycerol Added | Viscosity cps (25° C.) | Head Space Formaldehyde (%) |
|---|---|---|---|
| 1 | 20.7 (Start) | 96,800 | 50 |
| 2 | 9.9 (52% Reacted) | 70,000 | 45 |
| 3 | 5.1 (75% Reacted) | 60,000 | 23 |
| 4 | 4.2 (80% Reacted) | 102,000 | 67 |
| 5 | 2.5 (88% Reacted) | 109,200 | 27 |
| 6 (control) | (no glycerol) | 128,000 | 100 |
| 7 (control + 1.8% | | 118,000 | 95 |

TABLE I-continued

Properties Of Modified Resins Containing Glycerol

| Resin No. | % Formaldehyde When Glycerol Added | Viscosity cps (25° C.) | Head Space Formaldehyde (%) |
|---|---|---|---|
| glycerol added cold) | | | |

EXAMPLE 2

The general procedure of Example 1 was followed, except that other polyhydroxy compounds were substituted for glycerol. These compounds were all added during the first stage of the reaction at a point where the free formaldehyde was about 10% by weight. They were then reacted in the final stage to a free formaldehyde concentration of about 0.1%. The free formaldehyde in the head space, as well as the viscosity of these resins, were measured by the same method used in Example 1. The results given in Table II show that, like glycerol, other polyhydroxy compounds incorporated into the resin reduce the viscosity of the resin, as well as the amount of formaldehyde in the atmosphere above the resin.

TABLE II

Properties Of Modified Resins Containing Polyhydroxy Compounds

| Resin No. | Polyhydroxy Compound Added | Viscosity cps (25° C.) | Head Space Formaldehyde (%) |
|---|---|---|---|
| 8 | polyether triol (Hydroxyl No. 662) | 34,000 | 56 |
| 9 | ethylene glycol | 40,000 | 83 |
| 10 | 1,3-propanediol | 50,000 | 56 |
| 11 | triethylene glycol | 46,000 | 44 |
| 6 (control) | None | 128,000 | 100 |

EXAMPLE 3

The general procedure of Example 1 was followed, except that no methanol was added, the molar ratio of formaldehyde to phenol was 1.25:1 and the glycerol was replaced with a polyether triol having a hydroxyl number of 662. This triol was added in an amount of 0.024 mole per mole of phenol after the first step of the reaction had been carried out until the free formaldehyde in the reaction mixture was reduced to 10% by weight of the mixture. The final stage of the reaction was carried out until the free formaldehyde was about 0.1% by weight of the resin. The viscosity of this resin was 1,280,000 cps at 25° C. A control resin prepared in the safe manner without the addition of polyether triol had a viscosity of greater than 2,000,000 cps. This indicates that the process of this invention can be carried out using resins which do not incorporate a monohydric alcohol. This example also shows that such resins prepared using a hydroxy compound which contains two or more hydroxy groups per molecule gives a resin with considerably lower viscosity than a control prepared without the use of a hydroxy compound.

EXAMPLE 4

This example illustrates the use of the modified phenolic resole resin in the "no-bake" process. Solutions of various resins of Example 1 were prepared by dissolving 65 parts of the resin and 8 parts by weight of the dibasic ester DBE-9 and 27 parts by weight of an aromatic hydrocarbon solvent containing 98% aromatics, 2% aliphatics and having a distillation range of 55°-173° C. Each of the solutions also contained 0.4% of silane A-1160 available from the Union Carbide Corp., New York, N.Y. The isocyanate solution used for the preparation of the foundry binder was prepared by dissolving 71% by weight of a polymethylene polyphenyl isocyanate (M-20S, available from BASF Corporation) in an aromatic hydrocarbon solvent.

To a mixer was added 2500 g of silica sand. The mixture was started and 17.2 g of the modified phenolic resole resins solution and 14.1 g of the isocyanate solution were added. Then, 0.8 ml of a 25% solution of phenylpropylpyridine in the aromatic hydrocarbon solvent was added. The sand was discharged from the mixer one minute after the addition of the catalyst. The sand was used immediately to form standard American Foundry Society 1-inch dogbone tensile briquets using a Dietert No. 696 12-gang core box. Cores were cured at room temperature and broken after 10-minute, 1-hour and 24-hour cure times. Tensile strengths were determined using a Detroit Testing Machine Company, Model CST Tester. A comparative test run was made with Acme Bond No. 5044A, a commercial phenolic resin available from the Acme Resin Corporation, Westchester, Illinois. The results given in Table III indicate that the resins made by the process of this invention which show very low free formaldehyde can be used in the "no-bake" process to give cores of satisfactory strength comparable to those obtained using a commercial resole resin.

TABLE III

Cores Prepared By The No-Bake Process

| Resin No. Used In Test Cores | Tensile Strength (psi) | | |
|---|---|---|---|
| | 10 min. | 1 hr. | 24 hrs. |
| 1 | 65 | 235 | 323 |
| 2 | 75 | 247 | 298 |
| 3 | 93 | 248 | 348 |
| 5 | 97 | 213 | 333 |
| Commercial resin (comparative test) | 108 | 250 | 350 |

EXAMPLE 5

The tests described in Example 4 were repeated, using the resins prepared in Example 2. Again, the comparative test resin was the commercial resin 5044A of the Acme Resin Corporation. The results given in Table IV indicate that phenolic resole resins modified with a variety of polyhydroxy compounds are suitable for use in the "no-bake" process for making foundry cores and molds.

TABLE IV

Cores Prepared By The No-Bake Process

| Resin No. Used In Test Cores | Tensile Strength (psi) | | |
|---|---|---|---|
| | 10 min. | 1 hr. | 24 hrs. |
| 8 | 118 | 207 | 345 |
| 9 | 122 | 260 | 345 |
| 10 | 80 | 210 | 330 |
| 11 | 98 | 213 | 330 |
| Commercial resin (comparative test) | 112 | 265 | 340 |

EXAMPLE 6

This example illustrates the use of the modified phenolic resole resins in the "cold-box" process. For this process, a solution of the resin is prepared by dissolving 65 parts by weight of the resin in 8.6 parts of dioctyladipate, 15.8 parts of aromatic hydrocarbon solvent, 8.6 parts of dibasic ester DBE-9 and 2 parts of a release agent (a mixture of oleic acid and FLEXRICIN 100, a fatty acid available from Caschem, Bayonne, N.J.). The resin solution and isocyanate solution were mixed with sand in the same proportions as was done for the "no-bake" process in Example 4. In this case, the isocyanate solution contained 75% M-20S, 6.5% kerosene, 17.85% aromatic solvent and 0.65% benzenephosphorusoxydichloride. The foundry mix was blown into a Redford CBT-1 core blower. Cores were blown at 50 PSI air pressure and gassed for 3 seconds with 12% dimethylethylamine in carbon dioxide at 30 psi and then for 5 seconds with purge air at 30 psi. Tensile strengths were measured 1 minute, 1 hour and 24 hours after curing, using the Detroit testing machine Model CST tensile tester. Comparative tests were run on cores prepared using a commercial phenolic resin solution, Acme Flow No. 2014 available from the Acme Resin Corporation. The results given in Table V show that binders prepared using the modified phenolic resole resins are suitable for use in the cold box process for making cores and molds.

TABLE V

Cores Prepared By The Cold-Box Process

| Resin No. Used In Test Cores | Tensile Strength (psi) | | |
|---|---|---|---|
| | 1 min. | 1 hr. | 24 hrs. |
| 3 | 148 | 173 | 213 |
| 8 | 153 | 183 | 212 |
| Commercial resin (comparative test) | 163 | 198 | 218 |

EXAMPLE 7

The modified phenolic resole resins were also used to prepare test cores after the mixture of sand resin and isocyanate had been held for various times before they were gassed with the amine catalyst. The results given in Table VI show that the resin mix prepared using the modified phenolic resole resins which have low free formaldehyde have bench lives that are somewhat better than those prepared using the commercial resole resin.

TABLE VI

Bench Life Tests

| Resin No. Used In Test Cores | Tensile Strength (psi)* | | | | |
|---|---|---|---|---|---|
| | 0 hrs. | 1 hr. | 2 hrs. | 3 hrs. | 4 hrs. |
| 3 | 148 | 115 | 90 | 83 | 73 |
| 8 | 153 | 103 | 88 | 78 | 68 |
| Commercial resin (comparative test) | 163 | 105 | 83 | 58 | 52 |

*The times in the table refer to the age of the sand-resin mixture before cores were formed. Tests were run 1 minute after gassing.

Thus, it is apparent that there has been provided, in accordance with the present invention, a method for preparing a modified phenolic resole resin and a foundry binder composition that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A binder composition comprising a mixture of a phenolic resin component, an isocyanate component selected from diisocyanates and polyisocyanates and sufficient catalyst to cause substantially complete reaction between the phenolic resin component and the isocyanate component, wherein the phenolic resin component is a phenolic resole resin wherein the preponderance of the bridges joining the phenolic nuclei are ortho-ortho benzylic ether bridges and which has covalently bound into the resin an aliphatic hydroxy compound which contains two or more hydroxy groups per molecule and has a hydroxyl number of from about 200 to about 1850, the molar ratio of the hydroxy compound to the phenol being from abut 0.001:1 to about 0.03:1.

2. The binder composition of claim 1, wherein the aliphatic hydroxy compound which contains two or more hydroxy groups per molecule is selected from the group consisting of ethylene glycol, propylene glycol, 1,3-propanediol, diethylene glycol, triethylene glycol, glycerol, sorbitol and polyether polyols having a hydroxy number from about 200 to about 1850.

3. The binder composition of claim 1, wherein the phenolic resole resin is prepared from unsubstituted phenol and formaldehyde.

4. The binder composition of claim 1, wherein the isocyanate component is polymethylene polyphenylisocyante.

5. A binder composition comprising a mixture of a phenolic resin component, an isocyanate component selected from diisocyanates and polyisocyanates and sufficient catalyst to cause substantially complete reaction between the phenolic resin component and the isocyanate component, wherein the phenolic resin component is an alkoxy-modified phenolic resole resin wherein the preponderance of the bridges joining the phenolic nuclei are ortho-ortho benzylic ether bridges and which has covalently bound into the resin an aliphatic hydroxy compound which contains two or more hydroxy groups per molecule and has a hydroxyl number of from about 200 to about 1850, the molar ratio of the hydroxy compound to the phenol being from about 0.001:1 to about 0.03:1.

6. The binder composition of claim 5, wherein the alkoxy group is a methoxy group.

7. The binder composition of claim 5, wherein the aliphatic hydroxy compound witch contains two or more hydroxy groups per molecule is selected from the group consisting of ethylene glycol, propylene glycol, 1,3-propanediol, diethylene glycol, triethylene glycol, glycerol, sorbitol and polyether polyols having a hydroxy number from about 200 to about 1850.

8. The binder composition of claim 5, wherein the modified phenolic resole resin is prepared from unsubstituted phenol and formaldehyde.

9. The binder composition of claim 5, wherein the isocyanate component is polymethylene polyphenylisocyante.

* * * * *